United States Patent
Ohba et al.

(10) Patent No.: US 8,532,418 B2
(45) Date of Patent: Sep. 10, 2013

(54) IMAGE PROCESSING APPARATUS AND IMAGE PROCESSING METHOD

(75) Inventors: Akio Ohba, Kanagawa (JP); Hiroyuki Segawa, Kanagawa (JP); Tetsugo Inada, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 132 days.

(21) Appl. No.: 12/970,447

(22) Filed: Dec. 16, 2010

(65) Prior Publication Data

US 2011/0158524 A1 Jun. 30, 2011

(30) Foreign Application Priority Data

Dec. 28, 2009 (JP) .................................. 2009-297718

(51) Int. Cl.
*G06K 9/00* (2006.01)
*G06K 9/46* (2006.01)

(52) U.S. Cl.
USPC .......................................... 382/251; 382/240

(58) Field of Classification Search
USPC .................. 382/246, 247, 248, 250, 251, 252
See application file for complete search history.

(56) References Cited

U.S. PATENT DOCUMENTS

| | | | | |
|---|---|---|---|---|
| 5,020,120 A | * | 5/1991 | Weldy | 382/240 |
| 5,122,873 A | * | 6/1992 | Golin | 375/240.23 |
| 6,137,914 A | * | 10/2000 | Ligtenberg et al. | 382/240 |
| 6,181,826 B1 | * | 1/2001 | Weldy et al. | 382/240 |
| 6,563,999 B1 | | 5/2003 | Suzuoki et al. | |
| 6,668,086 B1 | * | 12/2003 | Enokida | 382/233 |
| 6,950,557 B2 | * | 9/2005 | Kimura | 382/239 |
| 6,970,508 B1 | * | 11/2005 | Kondo | 375/240.14 |
| 7,558,430 B2 | * | 7/2009 | Enokida | 382/240 |
| 2004/0130637 A1 | * | 7/2004 | Kake et al. | 348/239 |
| 2005/0276501 A1 | * | 12/2005 | Nakayama et al. | 382/251 |
| 2006/0147109 A1 | * | 7/2006 | Munsil et al. | 382/162 |
| 2007/0127826 A1 | * | 6/2007 | Kishi | 382/232 |
| 2008/0103717 A1 | * | 5/2008 | Hel-Or et al. | 702/107 |
| 2009/0046207 A1 | * | 2/2009 | Salvucci | 348/663 |
| 2010/0040297 A1 | * | 2/2010 | Ohba et al. | 382/232 |
| 2010/0079482 A1 | * | 4/2010 | Tsukamoto et al. | 345/596 |

* cited by examiner

*Primary Examiner* — Stephen R Koziol
*Assistant Examiner* — Jonathan S Lee
(74) *Attorney, Agent, or Firm* — Matthew B. Dernier, Esq.; Gibson & Dernier LLP

(57) ABSTRACT

A main memory stores M-bit gradation image data (M is a natural number). A correction function generating unit generates a correction function in N-bit gradation (N is a natural number, N>M) from image data. A display image generating unit generates display image data using a correction function generated by the correction function generating unit. The display image generating unit uses a correction function so as to generate display image data resulting from correcting image data obtained by decoding compressed image data in M-bit gradation with the restriction of M-bit quantization.

8 Claims, 13 Drawing Sheets

IMAGE PROCESSING APPARATUS AND IMAGE PROCESSING METHOD

BACKGROUND OF THE INVENTION

1. Field of the Invention

The present invention relates to an image processing technique for effectively suppressing color banding.

2. Description of the Related Art

There have been proposed home entertainment systems capable of not only executing game programs but also playing moving images. In such home entertainment systems, GPUs generate three-dimensional images using polygons (see Patent document 1, for example).

When smooth gradation with little noise is displayed on a display using gradation expression of an image format as typified by JPEG, there occurs "color banding," by which stair-like boundaries emphatically appear because of visual characteristics. Since general image formats, such as JPEG, MPEG, and BD formats, only support low gradation of 8-bit gradation, displaying a gradation image with low noise will cause color banding in principle. In order to prevent such color banding, there have been conventionally proposed methods such as dithering, in which noise is intentionally added to image data, and an error diffusion method, in which granular noise is added.

[Patent Document 1] U.S. Pat. No. 6,563,999

However, such noise as added to reduce color banding also causes reduction of image compression ratio. Also, even though noise is added to image data, color banding may often occur as a result because the image processing performed thereafter alters or transforms the added noise, thereby preventing the noise from performing the intended function.

Meanwhile, there have been developed in recent years display interfaces as typified by the HDMI (High-Definition Multimedia Interface) standard, which tend to support a larger number of bits. For example, with version 1.3, the HDMI standard defines signal transmission for 12 bits×3 colors, so that HDTV images with high gradation have become familiar. However, since images are quantized to 8 bits in an image format such as JPEG or MPEG, there are situations in which high-definition display interfaces are not fully utilized.

SUMMARY OF THE INVENTION

Accordingly, a purpose of the present invention is to provide an image processing technique for effectively suppressing color banding.

To solve the problem above, an image processing apparatus of an embodiment of the present invention comprises: an image data storage unit configured to store M-bit gradation image data (M is a natural number); a correction function generating unit configured to generate a correction function in N-bit gradation (N is a natural number, N>M) from image data stored in the image data storage unit; and a display image generating unit configured to generate display image data using a correction function generated by the correction function generating unit.

Another embodiment of the present invention is also an image processing apparatus. The apparatus comprises: an image data storage unit configured to store M-bit gradation image data (M is a natural number) including at least one compressed tile image per different resolution; a decoding unit configured to decode a compressed tile image into an M-bit gradation tile image; and a display image generating unit configured to generate display image data from a decoded tile image. Each tile image is formed by coding a plurality of block images. The image processing apparatus further comprises: a determination unit configured to determine if a block image used to generate display image data includes correction information; and a function deriving unit configured to derive, when correction information is included, a correction function using the correction information. The display image generating unit generates display image data using a decoded tile image and a correction function.

Optional combinations of the aforementioned constituting elements, and implementations of the invention in the form of methods, apparatuses, systems, recording media, and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Figure 1:
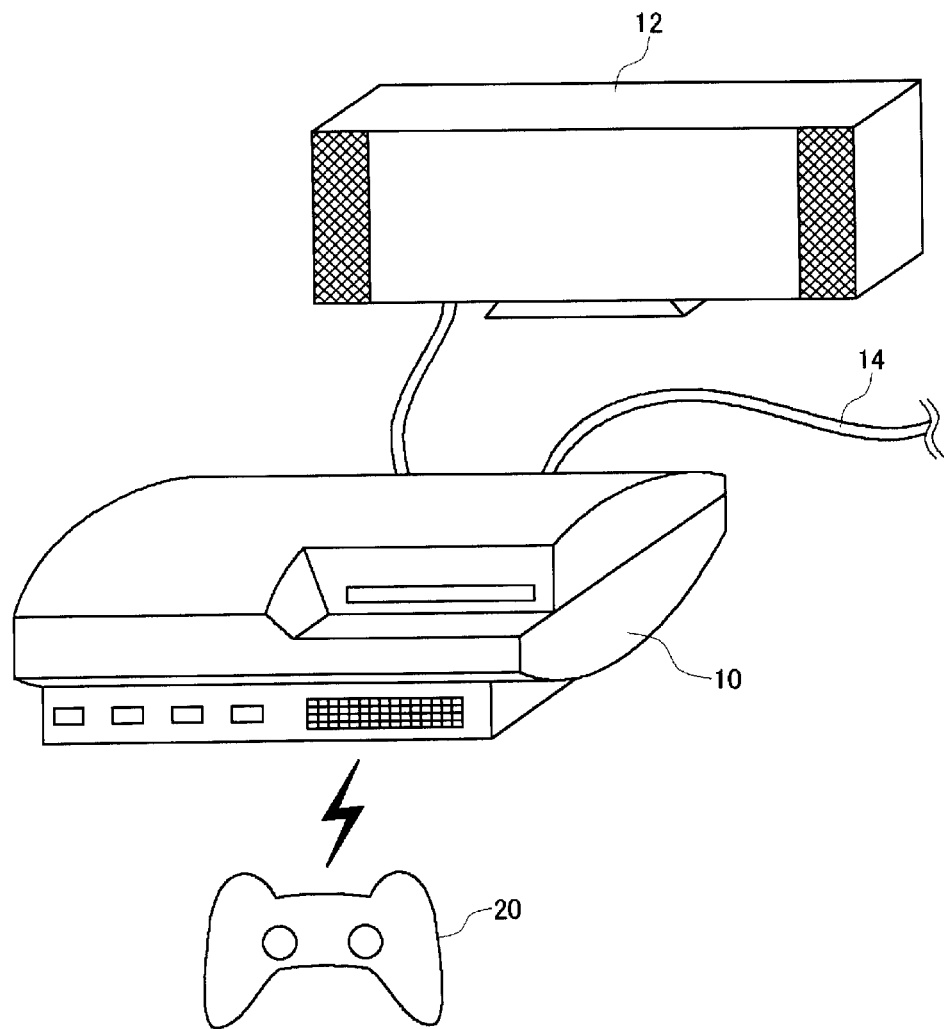
FIG. 1 is a diagram that shows a use environment of an image processing system according to an embodiment of the present invention.

FIG. 1 shows a use environment of an image processing system 1 according to an embodiment of the present invention. The image processing system 1 comprises an input device 20, an image processing apparatus 10 for executing image processing software, and a display apparatus 12 for outputting a processing result of the image processing apparatus 10. The display apparatus 12 may be a television having a display for outputting images and a speaker for outputting audio or may be a computer display. The display apparatus 12 may be connected by a wired cable to the image processing apparatus 10 or may be wirelessly connected thereto via a wireless local area network (LAN). The image processing apparatus 10, input device 20, and display apparatus 12 may be integrally formed as a portable terminal equipped with an image processing function.

The image processing apparatus 10 of the image processing system 1 may be connected to an external network, such as the Internet, via a cable 14 and used to download and acquire compressed image data that is hierarchized. Also, the image processing apparatus 10 may be connected to such an external network via wireless communication.

The image processing apparatus 10 may be a game device, for example, which loads an application program for image processing to perform an image processing function. Also, the image processing apparatus 10 may be a personal computer that similarly loads an application program for image processing to perform an image processing function.

In response to a user's request entered into the input device 20, the image processing apparatus 10 performs processing for modifying a display image, such as enlarging or reducing an image displayed on the display of the display apparatus 12 or moving such an image upward, downward, leftward, or rightward. When a user operates the input device 20 while viewing an image displayed on the display, the input device 20 transmits to the image processing apparatus 10 a modification instruction signal for modifying the display image.

Figure 2:
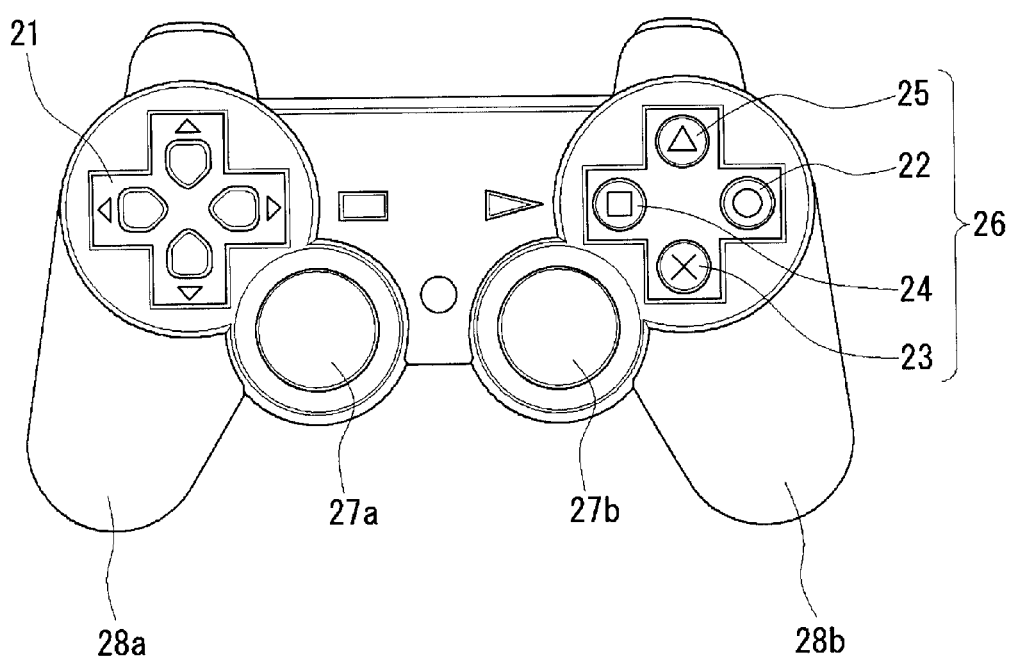
FIG. 2 is a plan view that shows an external configuration of an input device.

FIG. 2 shows an external configuration of the input device 20. The input device 20 includes, as operation means operable by a user, a directional key 21, analog sticks 27a and 27b, and four kinds of operation buttons 26. The four kinds of operation buttons 26 are the ○ (circle) button 22, x (cross) button 23, □ (square) button 24, and Δ (triangle) button 25.

Each of the operation means of the input device 20 in the image processing system 1 is assigned a function for entering a request for enlarging or reducing a display image or a request for scrolling up, down, left, or right. For example, the function of entering a request for enlarging or reducing a display image is assigned to the right analog stick 27b. The user can enter a request for reducing a display image by pulling the analog stick 27b toward the user, and also can enter a request for enlarging a display image by pushing the stick forward. Also, the function of entering a request for scrolling a display image is assigned to the directional key 21. By pressing the directional key 21, the user can enter a request for scrolling in the direction in which the directional key 21 is pressed. Such a function of entering an instruction for modifying an image may be assigned to another operation means, so that the function of entering a scrolling request may be assigned to the analog stick 27a, for example.

The input device 20 has a function to transfer to the image processing apparatus 10 an image modification instruction signal that has been entered, and, in this embodiment, the input device 20 is configured to be able to wirelessly communicate with the image processing apparatus 10. Between the input device 20 and image processing apparatus 10 may be established a wireless connection using the Bluetooth (registered trademark) protocol or IEEE802.11 protocol. Also, the input device 20 may be connected to the image processing apparatus 10 by a cable to transmit an image modification instruction signal to the image processing apparatus 10.

Figure 3:
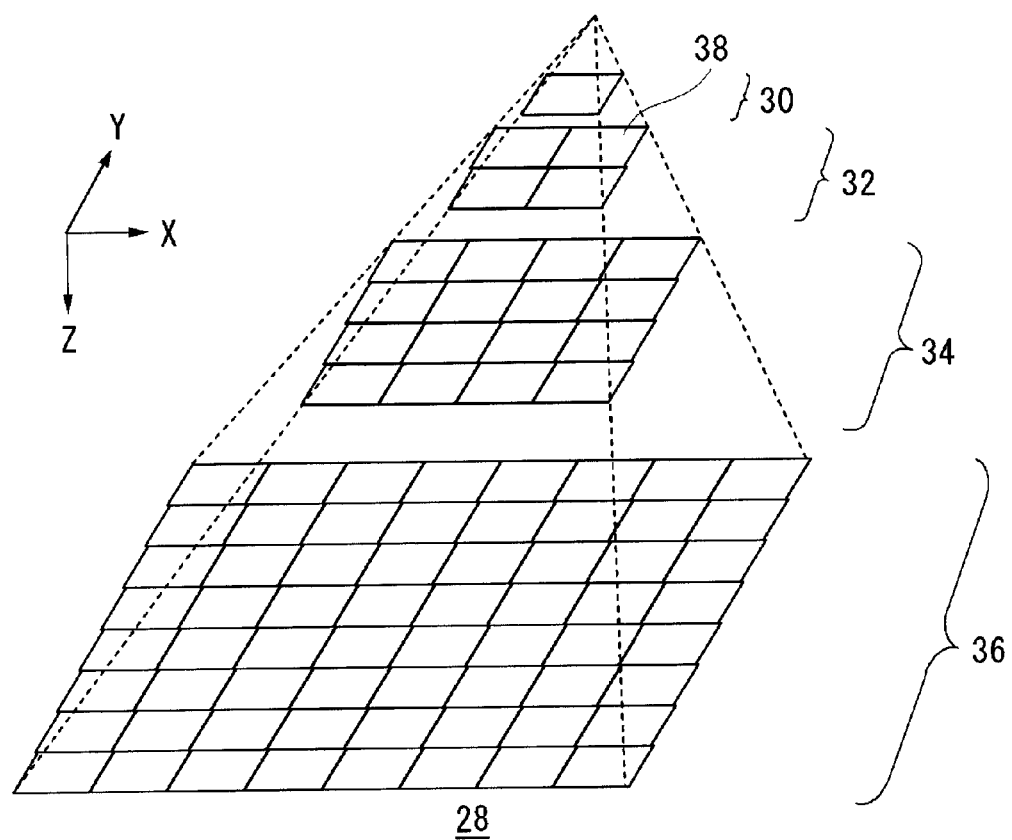
FIG. 3 is a diagram that shows a hierarchical structure of image data used in an image processing system.

FIG. 3 shows a hierarchical structure of image data used in the image processing system 1. The image data has a hierarchical structure including a zeroth layer 30, a first layer 32, a second layer 34, and a third layer 36 in the depth (Z-axis) direction. Hereinafter, image data having such a hierarchical structure will be referred to as "hierarchical data". There may be provided layers higher than the third layer. The hierarchical data 28 shown in FIG. 3 has a quadtree hierarchical structure, in which each layer consists of one or more tile images 38. Every tile image 38 is formed to be of the same size having the same number of pixels, such as 256×256 pixels, for example. The image data in each layer represents the same image at a different resolution, and the image data in the second layer 34, the first layer 32, and the zeroth layer 30 are generated by reducing the original image in the third layer 36, which has the highest resolution, in multiple stages. For example, the resolution in the N-th layer (N is an integer greater than or equal to zero) is half the resolution in the (N+1)th layer both in the horizontal (X-axis) direction and in the vertical (Y-axis) direction.

In the image processing apparatus 10, the hierarchical data 28 is compressed in a predetermined compression format and stored in a storage device, and the data is read out from the storage device and decoded before being displayed on the display. The image processing apparatus 10 of the present embodiment may be provided with a decoding function compatible with multiple kinds of compression formats. The compression process of the hierarchical data may be performed in units of tile images, and, in the same layer, the process may be performed in units of multiple tile images.

As shown in FIG. 3, the hierarchical structure of the hierarchical data 28 is defined by the X-axis in the horizontal direction, the Y-axis in the vertical direction, and the Z-axis in the depth direction, thereby constructing virtual three-dimensional space. In this hierarchical structure, the X-axis and Y-axis define a common coordinate system having the same origin. From an input signal provided by the input device 20, the image processing apparatus 10 derives the amount of modification to be made to the display image and uses the amount to derive the coordinates at the four corners of a frame image (frame coordinates) in the virtual space. Frame coordinates in the virtual space are used for processing of reading a tile image or generating a display image. Instead of frame coordinates in the virtual space, the image processing apparatus 10 may derive information for specifying a layer and the texture coordinates (UV coordinates) in the layer. Alternatively, the image processing apparatus 10 may derive the coordinates of the center of a frame image (X, Y) in the virtual space and the scale SCALE. For example, if it is assumed that an entry from a user is a request for moving a virtual camera in the hierarchical structure of the hierarchical data 28, the combination of the coordinates of the center of a frame image and scale information (X, Y, SCALE) may be referred to as virtual camera image coordinates. Hereinafter, for the sake of convenience, (X, Y, SCALE) may be referred to as virtual camera image coordinates, and an image modification instruction signal may be regarded as a signal for moving a virtual camera in the virtual space and specifying the virtual camera image coordinates (X, Y, SCALE) for each frame. The SCALE may be defined as the scale of a frame image when the scale of the display image in the third layer 36 is considered to be 1. The SCALE may be defined as a combination of a scale in the X-axis direction (X_SCALE) and a scale in the Y-axis direction (Y_SCALE), and an aspect ratio may be made modifiable by specifying different values for the X_SCALE and Y_SCALE. In such a case, virtual camera image coordinates are provided as (X, Y, X_SCALE, Y_SCALE).

Figure 4:
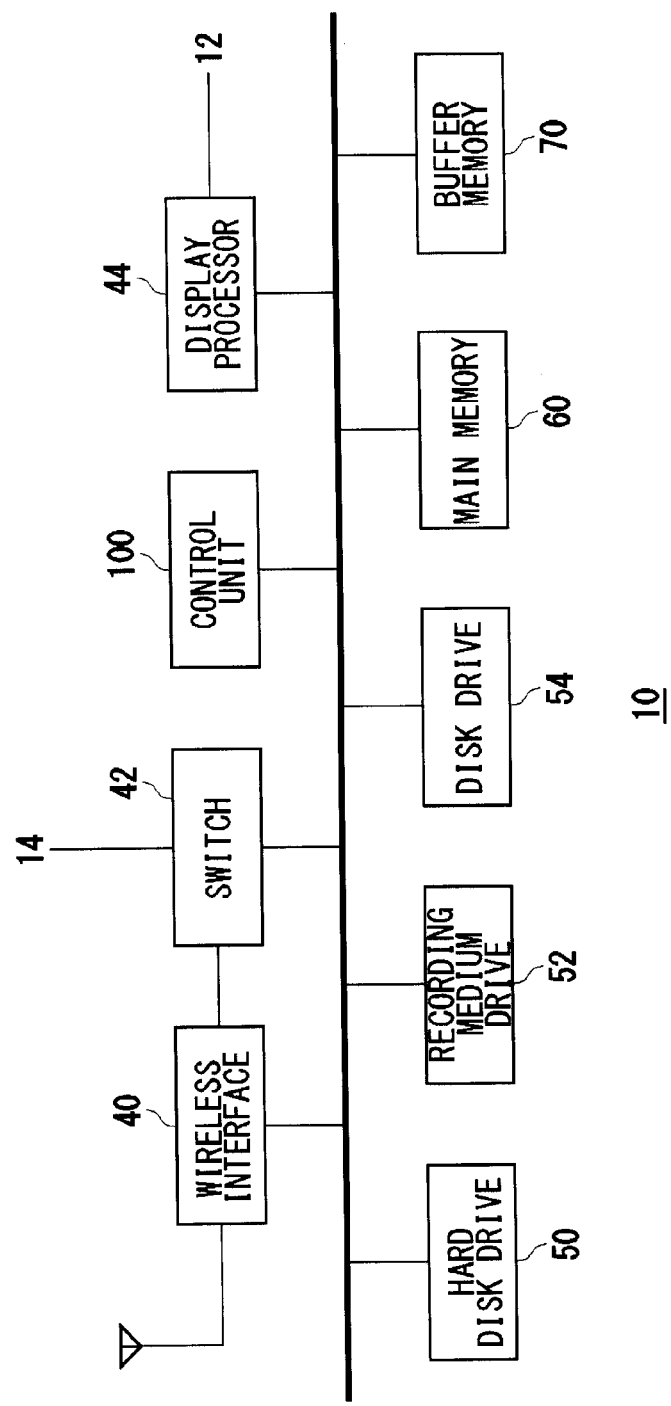
FIG. 4 is a functional block diagram of an image processing apparatus.

FIG. 4 is a functional block diagram of the image processing apparatus 10. The image processing apparatus 10 is configured with a wireless interface 40, a switch 42, a display processor 44, a hard disk drive 50, a recording medium drive 52, a disk drive 54, a main memory 60, a buffer memory 70, and a control unit 100. The display processor 44 includes a frame memory for buffering data to be displayed on the display of the display apparatus 12.

The switch 42 is an Ethernet switch (Ethernet is a registered trademark) and is a device connected to an external device by wired or wireless means so as to transmit or receive data. The switch 42 may be connected to an external network via the cable 14 to receive hierarchical compressed image data from an image server. The switch 42 is also connected to the wireless interface 40, which is connected to the input device 20 using a predetermined wireless communication protocol. An image modification instruction signal input by a user into the input device 20 is provided to the control unit 100 via the wireless interface 40 and switch 42.

The hard disk drive 50 functions as an auxiliary storage device for storing data. Compressed image data received via the switch 42 may be stored in the hard disk drive 50. When display processing is performed, compressed image data stored in the hard disk drive 50 is read into the main memory 60. Upon insertion of a removable recording medium, such as a memory card, the recording medium drive 52 reads data from the medium. When a ROM disk, which is read-only, is placed in the disk drive 54, the disk drive 54 drives and recognizes the ROM disk and reads data therefrom. The ROM disk may be an optical disk, a magneto-optical disk, or the like. Compressed image data retained in a removable recording medium or a ROM disk may be stored in the hard disk drive 50.

The control unit 100 is provided with a multi-core CPU, which includes one general-purpose processor core and multiple simple processor cores. The general-purpose processor core is referred to as a power processing unit (PPU), and the other processor cores are referred to as synergistic-processing units (SPUs).

The control unit 100 is also provided with a memory controller connected to the main memory 60 and buffer memory 70. The PPU is provided with a register and also with a main processor as the entity executing operation, and efficiently assigns tasks, which are basic units of processing in a running application, to the respective SPUs. The PPU itself may also execute a task. An SPU includes a register, a sub-processor as the entity executing operation, and a local memory as a local storage area. The local memory may be used as the buffer memory 70. The main memory 60 and buffer memory 70 are storage devices and are configured as random access memory (RAM). An SPU also includes a dedicated direct memory access (DMA) controller as a controlling unit, enabling high-speed data transfer between the main memory 60 and buffer memory 70 and also between the frame memory in the display processor 44 and buffer memory 70. The control unit 100 of the present embodiment performs a high-speed image processing function by operating multiple SPUs in parallel. The display processor 44 is connected to the display apparatus 12 and outputs a result of image processing in response to a user's request.

The image processing apparatus 10 of the present embodiment has a function to effectively suppress color banding, in which, when generating display image data to be displayed on the display apparatus 12 using compressed image data, the image processing apparatus 10 generates a correction function of the image data. Although there will be described an example in which compressed image data is image data in JPEG format, the image data may be in another format and the coding method is not specified.

In JPEG, an image is divided into blocks of a fixed size (8×8 pixels), and a discrete cosine transform (DCT) is performed on each of the blocks so that conversion processing from the spatial domain to the frequency domain is performed. The image data within a transformed block is reduced in information amount through quantization and compressed through entropy coding using a Huffman code. In the hierarchical data 28 of the present embodiment, a tile image 38 consists of 256×256 pixels, so that, when the compression process is performed in units of tile images, 32×32 block images are coded.

The hierarchical data 28 may be generated using the original image data of JPEG format. In the example of FIG. 3, the image data with the highest resolution in the third layer 36 can be generated by dividing the original image data into tile images that each consist of 256×256 pixels without changing the resolution. Subsequently, the image data in the second layer 34 is generated by reducing the resolution of the original image data to one-half and dividing the reduced image data into tile images that each consist of 256×256 pixels. Reducing the resolution of the original image data to one-half is equivalent to reducing 16×16 pixel image data of the original image by half both horizontally and vertically to generate an 8×8 pixel block image. Similarly, the image data in the first layer 32 is generated by reducing the resolution of the original image data to one-quarter, and hence, the image data of the respective blocks constituting a tile image in the first layer 32 is configured by reducing 32×32 pixel image data of the original image to one-quarter both horizontally and vertically. Further, the zeroth layer 30 can be considered similarly, and the image data of the respective blocks constituting a tile image in the zeroth layer 30 is configured by reducing 64×64 pixel image data of the original image to one-eighth both horizontally and vertically.

The image processing apparatus 10 of the present embodiment has a function to perform software decoding on JPEG image data, and performs an inverse discrete cosine transform (IDCT) on JPEG image data to perform conversion processing from the frequency domain to the spatial domain. With such a software decoding function, JPEG image data expressed in 8-bit gradation is converted into image data expressed in 32-bit gradation, thereby increasing the number of gradation of image data. The image processing apparatus 10 also has a function to output signals with 12 bits×3 colors (i.e., DeepColor output) conforming to version 1.3 of the HDMI standard.

Figures 5A, 5B:
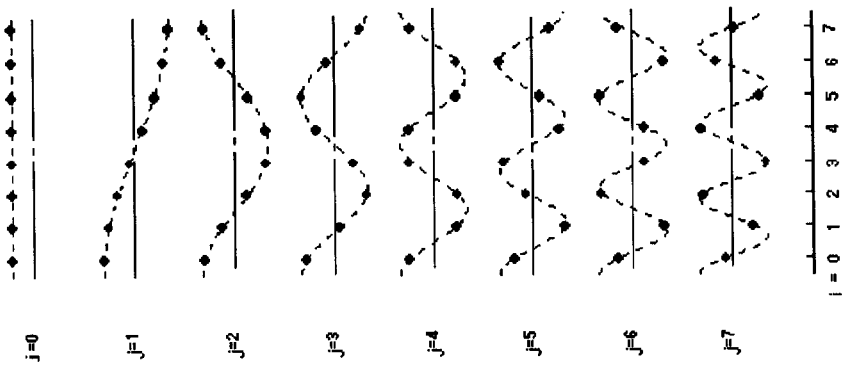
FIG. 5A is a diagram that shows an operation expression of an IDCT.
FIG. 5B is a diagram that shows an operation result obtained by using a software decoding function of an image processing apparatus.

FIG. 5A shows an operation expression of an IDCT, and FIG. 5B shows an operation result obtained by using the software decoding function of the image processing apparatus 10. The horizontal axis in the operation results represents pixels within a block in the X-axis direction. As shown in the operation results, by decoding JPEG image data in 32-bit gradation, there can be obtained outputs of pixel values that smoothly change within a block.

Figure 6A:
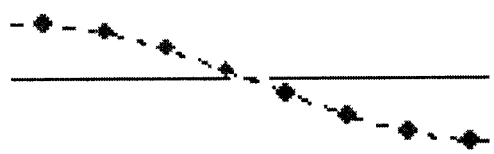
FIG. 6A is a diagram that shows an example of a 32-bit gradation output.
Figure 6B:
FIG. 6B is a diagram that shows an output obtained by quantizing the output of FIG. 6A to 8-bit gradation.

FIG. 6A shows an example of a 32-bit gradation output. This example is the output when j=1 in FIG. 5B. FIG. 6B shows an output obtained by quantizing the output of FIG. 6A to 8-bit gradation. When using a normal JPEG decoder implemented by hardware, instead of using the software decoder used in the image processing apparatus 10, the JPEG hardware decoder generates an output quantized to 8 bits, i.e., generates the same output as shown in FIG. 6B as a result. The variation of the pixel value in FIG. 6B shows the step width of the 8-bit quantized output.

The image processing apparatus 10 of the present embodiment enables 32-bit gradation output as shown in FIG. 6A by using the software decoding function. Quantization of a 32-bit gradation output to 8 bits will provide an output identical with that from a normal JPEG hardware decoder. However, since the step width of an 8-bit quantized output is large, color banding will be highly likely to occur. In this situation, the inventors have conceived the idea of suppressing color banding by using such a 32-bit output as a correction function for correcting JPEG image data to generate display image data.

Figure 6C:
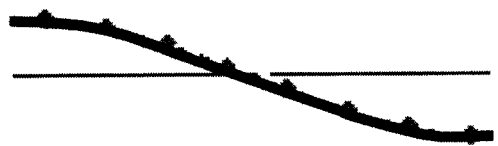
FIG. 6C is a diagram that shows a DeepColor output generated by using a correction function.

More specifically, since it is compatible with 12-bit digital output for each color (DeepColor output), the image processing apparatus 10 generates display image data in 12-bit gradation from JPEG image data using a 32-bit gradation output as a correction function. In this way, by converting JPEG image data in 8-bit gradation into display image data in 12-bit gradation, by which the number of gradation is increased, the step width of the quantized output can be reduced, thereby suppressing color banding. FIG. 6C shows a DeepColor output generated by using a correction function. If the image processing apparatus 10 is not compatible with DeepColor output, color banding may be suppressed by generating a lower bit for dithering from a 32-bit output and adding the bit as noise to an 8-bit gradation output. Thus, even if color banding would occur when the original JPEG image data is normally decoded in 8-bit gradation, a display image in which color banding is suppressed can be generated from such JPEG image data by using the image processing apparatus 10, which performs decoding operation processing in higher gradation and uses the operation result as a correction function.

Figure 7:
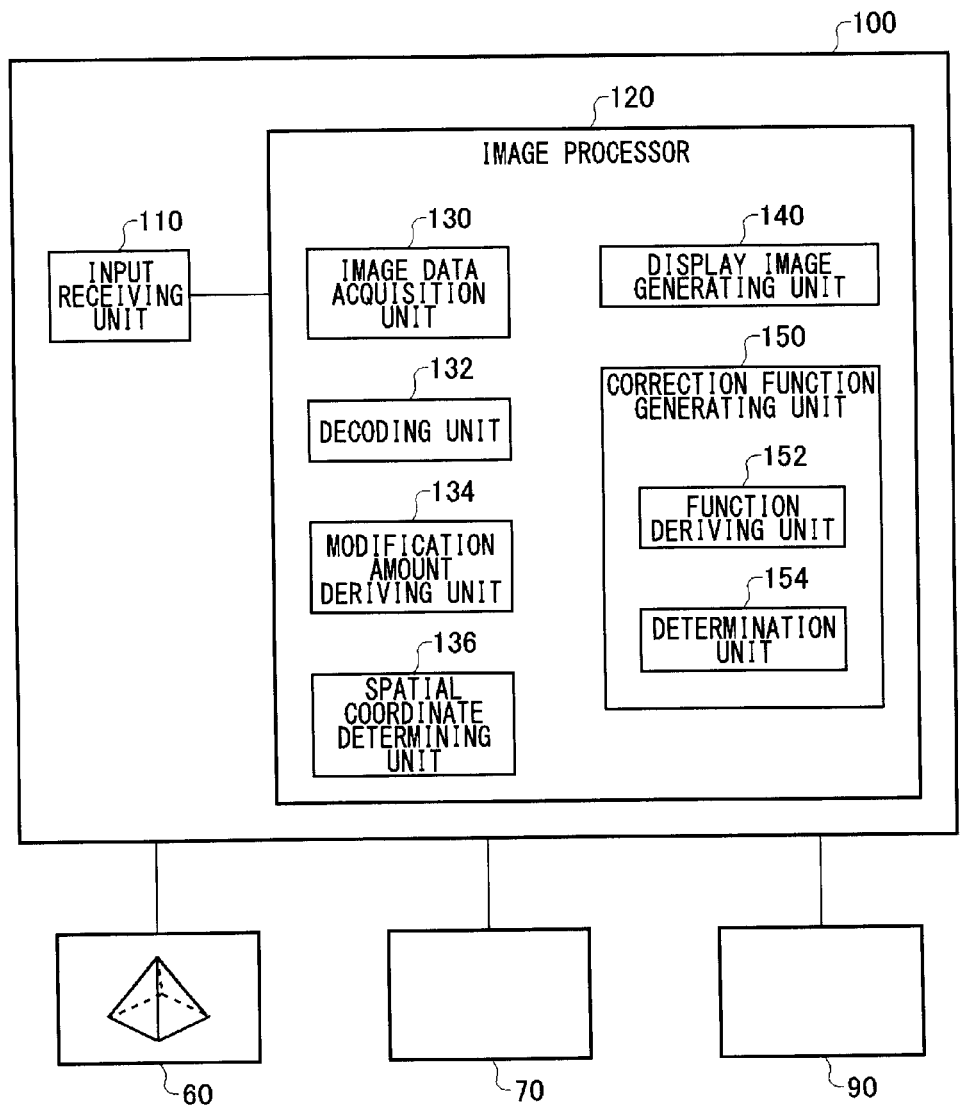
FIG. 7 is a block diagram that shows a configuration of a control unit.

FIG. 7 shows a configuration of the control unit 100. The control unit 100 includes an input receiving unit 110 and an image processor 120. The input receiving unit 110 receives an image modification instruction signal provided from the input device 20. The image processor 120 comprises an image data acquisition unit 130, a decoding unit 132, a modification amount deriving unit 134, a spatial coordinate determining unit 136, a display image generating unit 140, and a correction function generating unit 150. The correction function generating unit 150 includes a function deriving unit 152 and a determination unit 154. The correction function generating unit 150 may have a decoding function and may be integrally formed with the decoding unit 132. In the following, it will be assumed that each of the correction function generating unit 150 and decoding unit 132 has a decoding function.

Each of the elements represented by functional blocks for performing various processes shown in FIG. 7 can be implemented by a central processing unit (CPU), a memory, an LSI or the like in terms of hardware, and by a memory-loaded program or the like in terms of software. As mentioned previously, the control unit 100 is provided with one PPU and multiple SPUs, and each of the functional blocks in FIG. 7 may be formed by the PPU or an SPU separately or a combination of the PPU and SPUs. Accordingly, it will be obvious to those skilled in the art that these functional blocks may be implemented in a variety of forms by hardware only, software only, or a combination thereof, and the form is not limited to any of them.

First, the basic image display processing function of the image processing apparatus 10 will be described. With this function, the image processing apparatus 10 performs processing for modifying a display image, such as enlarging or reducing an image displayed on the display apparatus 12 or scrolling such an image, according to a user's instruction. For the sake of brevity, it will be assumed below that the display apparatus 12 already displays an image.

When a user operates an analog stick 27 or the directional key 21 of the input device 20, an image modification instruction signal is transmitted to the image processing apparatus 10. The input receiving unit 110 then receives from the input device 20 the modification instruction signal for modifying the display image displayed on the display apparatus 12.

Based on such a modification instruction signal, the modification amount deriving unit 134 derives the amount of modification requested to be made to the display image. The amount of modification of a display image is provided as a combination of shift amounts of each frame of the display image in the vertical, horizontal, and depth directions in the virtual three-dimensional space of the hierarchical data. The spatial coordinate determining unit 136 determines the spatial coordinates (virtual camera image coordinates) of the current frame obtained by moving the spatial coordinates of the previous frame by the derived amount of modification. It is assumed here that spatial coordinates are defined by information (X, Y, SCALE), which is specified by the coordinates of the center of a frame image (X, Y) and the scale SCALE. The modification amount deriving unit 134 derives an amount of modification ($\Delta X$, $\Delta Y$, $\Delta SCALE$) based on a modification instruction signal, and the spatial coordinate determining unit 136 then determines the spatial coordinates of the current frame (X, Y, SCALE) by adding the amount of modification ($\Delta X$, $\Delta Y$, $\Delta SCALE$) to the spatial coordinates of the previous frame (Xprev, Yprev, SCALEprev). As stated previously, spatial coordinates may be defined by other parameters.

Upon reception of spatial coordinates from the spatial coordinate determining unit 136, the image data acquisition unit 130 determines if a tile image need be modified to generate display image data, and, if the tile image currently used need be modified, the image data acquisition unit 130 will read the tile image from the main memory 60. The decoding unit 132 decodes the read tile image and stores the image in the buffer memory 70. Based on the spatial coordinates, the display image generating unit 140 generates display image data using the tile image stored in the buffer memory 70 and provides the display image data to a frame memory 90. The display processor 44 outputs, through the display apparatus 12, the display image data overwritten in the frame memory 90. The operation described above is the basic image display processing function. Meanwhile, the image processing apparatus 10 of the present embodiment has a function to perform image display processing while suppressing color banding in the display image. As will be described below, in the present embodiment, a correction function for suppressing color banding is obtained as a result of decoding a tile image and retained in the buffer memory 70, and the display image generating unit 140 then generates display image data using the correction function retained in the buffer memory 70. Such a color banding suppressing function is performed in the following way.

When image display processing is performed, compressed image data in M-bit gradation (M is a natural number) is read out from the hard disk drive 50 and stored in the main memory 60. The main memory 60 stores the hierarchical data 28 in 8-bit gradation of JPEG format as an example, but the image data may be in another format, as mentioned previously.

After the spatial coordinate determining unit 136 determines the spatial coordinates of the current frame based on a modification instruction signal from the input device 20, the image data acquisition unit 130 reads from the main memory 60 a tile image required to generate display image data and supplies the tile image to the correction function generating unit 150 provided with a decoding function. Also, based on the spatial coordinates of the current frame and the previous frame, etc., the image data acquisition unit 130 may read from the main memory 60 a tile image that is highly possible to be required to generate display image data in the future, i.e., may perform so-called prefetching. By performing prefetching, the image processing apparatus 10 is able to generate display image data while reflecting an entry from the user in real time.

The correction function generating unit 150 generates, from the received tile image, a correction function in N-bit gradation (N is a natural number, N>M). The correction function generating unit 150 has a software decoding function and performs an inverse discrete cosine transform (IDCT) on JPEG image data to perform conversion processing from the frequency domain to the spatial domain. With the software decoding function, JPEG image data expressed in 8-bit gradation is converted into image data expressed in 32-bit gradation, thereby increasing the number of gradation of image data. The function deriving unit 152 specifies the converted image data in 32-bit gradation as a correction function of the JPEG image data. Alternatively, the function deriving unit 152 may quantize the image data in 32-bit gradation to image data in P-bit gradation (P is a natural number, N≧P>M, N=32) and specify the quantized image data as a correction function. Also, the function deriving unit 152 may derive a correction function used for dithering on image data obtained by decoding compressed image data in M-bit gradation with the restriction of M-bit quantization. The function deriving unit 152 stores such a specified or derived correction function in the buffer memory 70. As stated previously, the software decoding may also be performed by the decoding unit 132, and, in such a case, the decoding unit 132 will function as an element of the correction function generating unit 150.

The display image generating unit 140 generates display image data based on the spatial coordinates of the current frame, using the correction function stored in the buffer memory 70. By using a correction function, the display image generating unit 140 can generate display image data resulting from correcting image data obtained by decoding compressed image data in M-bit gradation with the restriction of M-bit quantization.

For example, the display image generating unit 140 may use a correction function to generate display image data in P-bit gradation (P is a natural number, N≧P>M) resulting from performing interpolation operation on a tile image stored in the main memory 60. When the image processing apparatus 10 is compatible with DeepColor output, the display image generating unit 140 uses a correction function to generate display image data in 12-bit gradation resulting from performing interpolation operation on a tile image. FIG. 6C shows a DeepColor output generated by using a correction function. In this way, by expanding JPEG image data in 8-bit expression into display image data in 12-bit expression, the quantization step width can be reduced, thereby suppressing color banding in the display image.

Also, the display image generating unit 140 may use a correction function to generate display image data in M-bit gradation resulting from performing dithering on a tile image stored in the main memory 60. If the image processing apparatus 10 is not compatible with DeepColor output, the display image generating unit 140 is unable to increase the number of gradation and required to generate M-bit display image data. In such a case, dithering can be performed on a tile image by using a correction function, so that color banding in the display image can be suppressed. In comparison with conventional dithering, there is no need to process the original image in advance and a correction function is derived from the original image to correct the original image, so that color banding can be effectively suppressed according to the present embodiment.

Thus, the image processing apparatus 10 efficiently uses a rich operation result using a software decoding function, so that there is no need to process the original image in advance and color banding can be effectively suppressed. Although the embodiment shows an example in which the image processing apparatus 10 has a software decoding function for enabling 32-bit gradation output, the increased number of bits is not limited to 32 and may be any number larger than M bits (M=8 in the example). Also, instead of the software decoding function, the image processing apparatus 10 may be provided with a hardware decoding function by which the number of gradation of image data can be increased.

Figure 8:
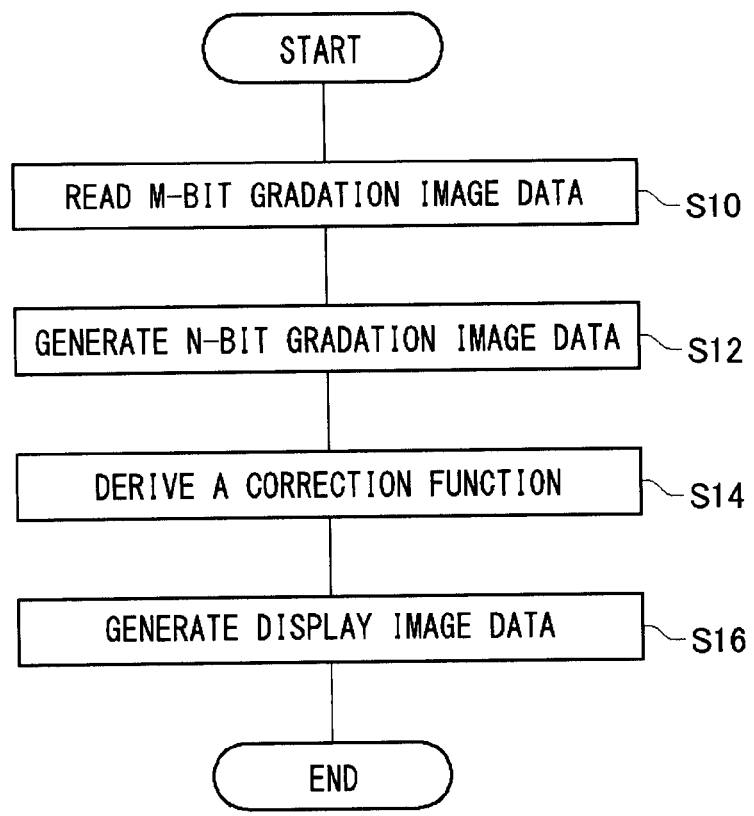
FIG. 8 is a flowchart for describing processing for suppressing color banding.

FIG. 8 is a flowchart for describing processing for suppressing color banding. The main memory 60 stores M-bit gradation image data (M is a natural number). The image data acquisition unit 130 reads from the main memory 60 an M-bit gradation tile image required to generate display image data (S10) and supplies the tile image to the correction function generating unit 150 provided with a decoding function. The correction function generating unit 150 then generates N-bit gradation image data (N is a natural number, N>M) from the received tile image (S12) and derives a correction function (S14). Thereafter, the display image generating unit 140 generates display image data using the derived correction function (S16).

In the above description, when an interpolation value is obtained in a block image that is to be output after 8-bit quantization, a lower bit for DeepColor output or dithering is generated from a 32-bit gradation output as shown in FIG. 6A so as to suppress color banding. Meanwhile, there is a case where an interpolation value cannot be obtained in a block image, i.e., a case where the block only includes direct-current components. However, the image processing apparatus 10 can derive a correction function also in such a case, using the hierarchical structure of the hierarchical data 28. In the following, description will be made using image data obtained by decoding a tile image with the restriction of 8-bit quantization, for the sake of convenience. Also, since there may be a case where a block in image data corrected based on a 32-bit gradation output only includes direct-current components, the derivation of a correction function using the hierarchical structure may be applied to such corrected image data.

Figure 9:
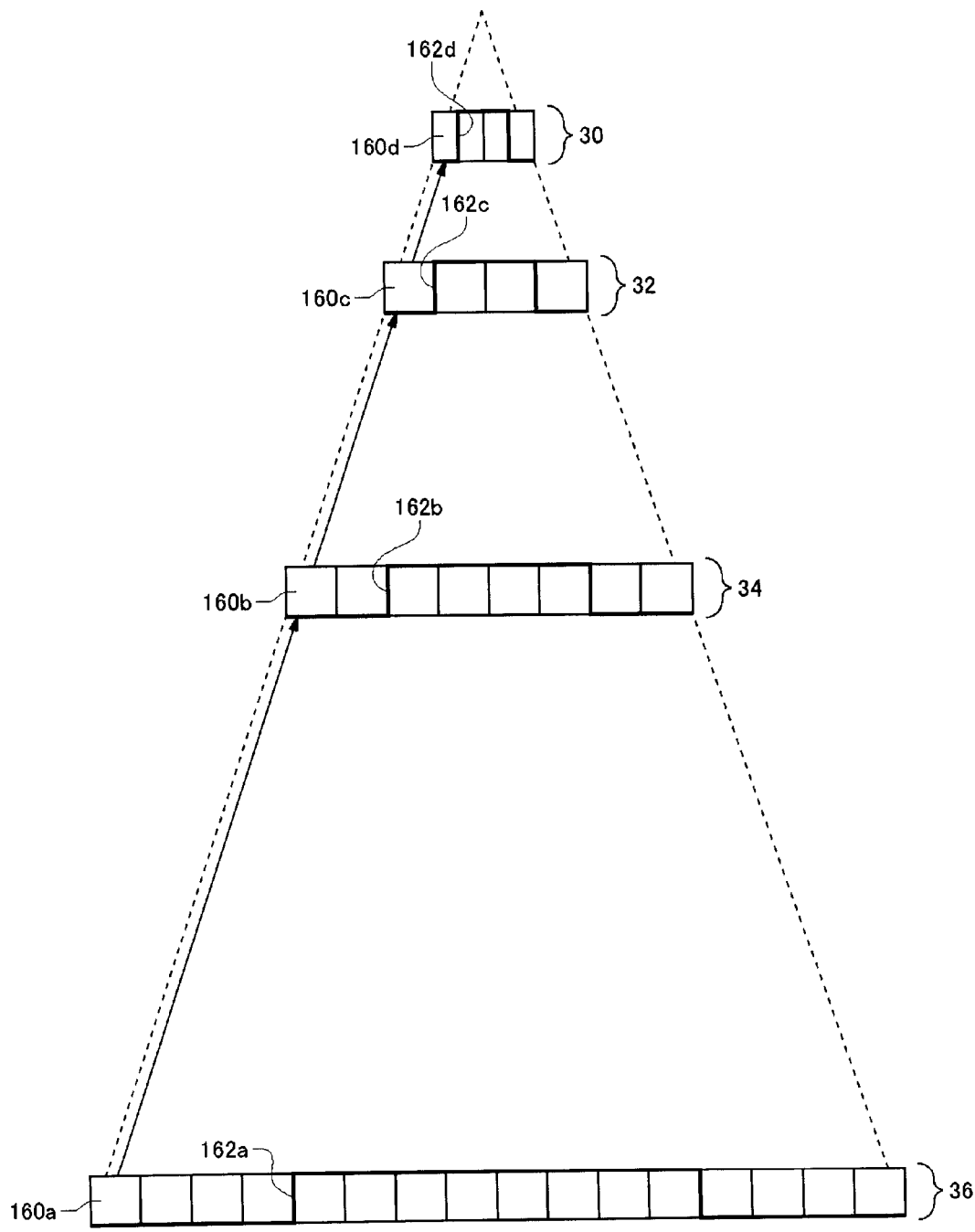
FIG. 9 is a diagram for describing processing for deriving a correction function using a hierarchical structure.

FIG. 9 is a diagram for describing processing for deriving a correction function using a hierarchical structure. In FIG. 9, a horizontal width of a rectangular area virtually represents a one-dimensional domain (8 pixels) of a block image, and a vertical length of a rectangular area represents a quantization step width. In order to facilitate understanding, the relationships between block images in the respective layers are shown in the same way as shown in FIG. 3. In the processing of deriving a correction function, it is determined whether or not correction information is included in a block image, and, if correction information is included, a correction function is derived using the correction information. The correction information is information indicating that a pixel value in a block image is varying. In FIG. 9, each of the bold black lines 162a, 162b, 162c, and 162d denotes a quantized pixel value.

It is assumed here that a block image 160a in the third layer 36 need be used to generate display image data. The block image 160a only includes direct-current components and does not include correction information. Accordingly, since a correction function cannot be derived, it is determined whether or not correction information is included in a block image with a lower resolution corresponding to the block image 160a. A block image with a lower resolution corresponding to the block image 160a in the third layer 36 is a block image 160b in the second layer 34. The block image 160*b* is formed by reducing four block images in the third layer 36 including the block image 160*a*.

Since correction information is not included in the block image 160*b* either, it is determined whether or not correction information is included in a block image 160*c* in the first layer 32 corresponding to the block image 160*b* in the second layer 34. Also, since correction information is not included in the block image 160*c* either, it is further determined whether or not correction information is included in a block image 160*d* in the zeroth layer 30 corresponding to the block image 160*c* in the first layer 32. The block image 160*d* includes correction information indicating a variation in pixel value. Based on the correction information, a correction function for the block image 160*d* is derived.

Figure 10:
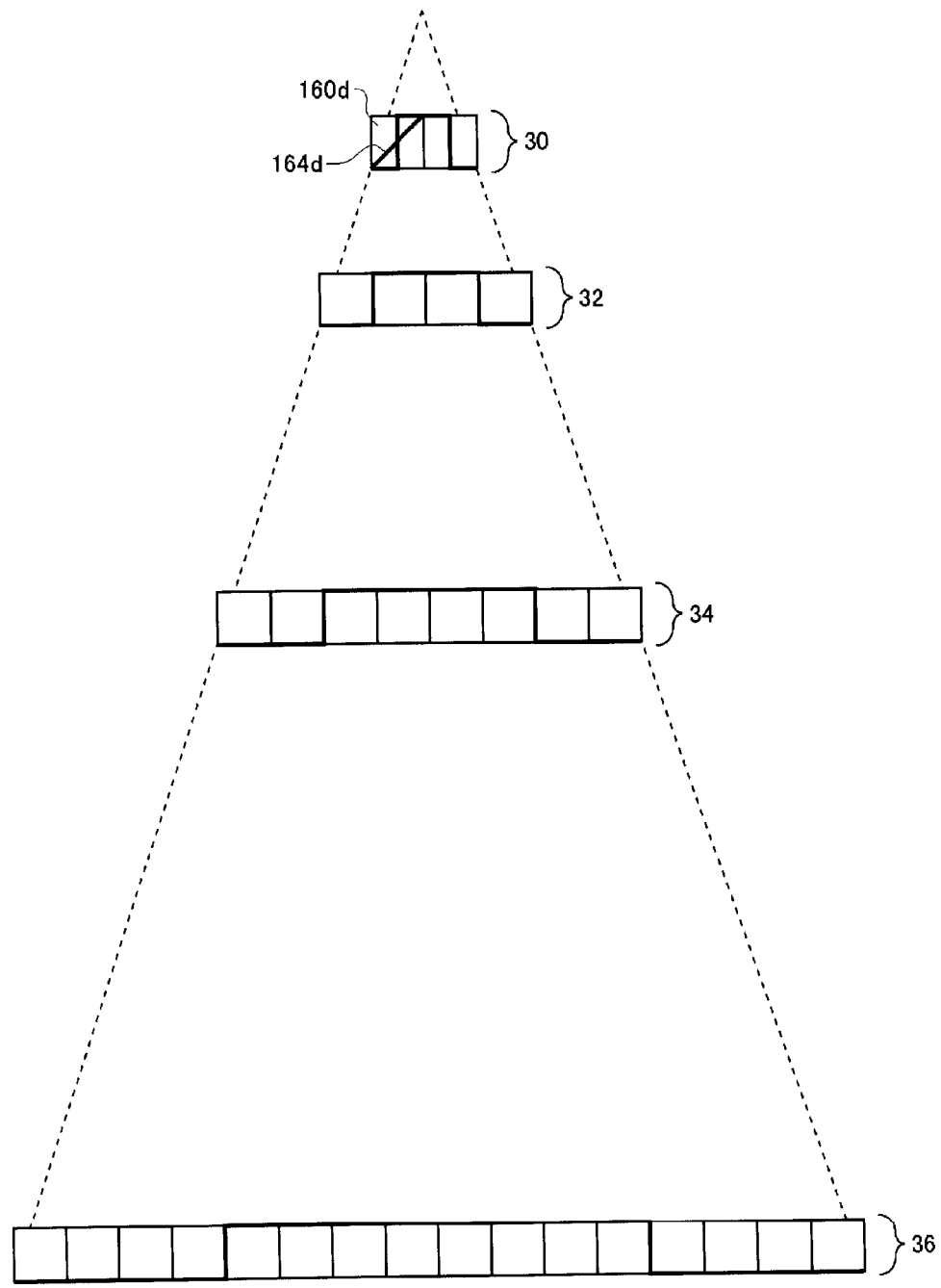
FIG. 10 is a diagram that shows a correction function derived for a block image in the zeroth layer.

FIG. 10 shows a correction function 164*d* derived for the block image 160*d* in the zeroth layer 30. The correction function 164*d* is derived as a linear function but may be derived as another kind of function. When the correction function 164*d* is derived, a correction function for the block image 160*a* in the third layer 36 is also derived.

Figure 11:
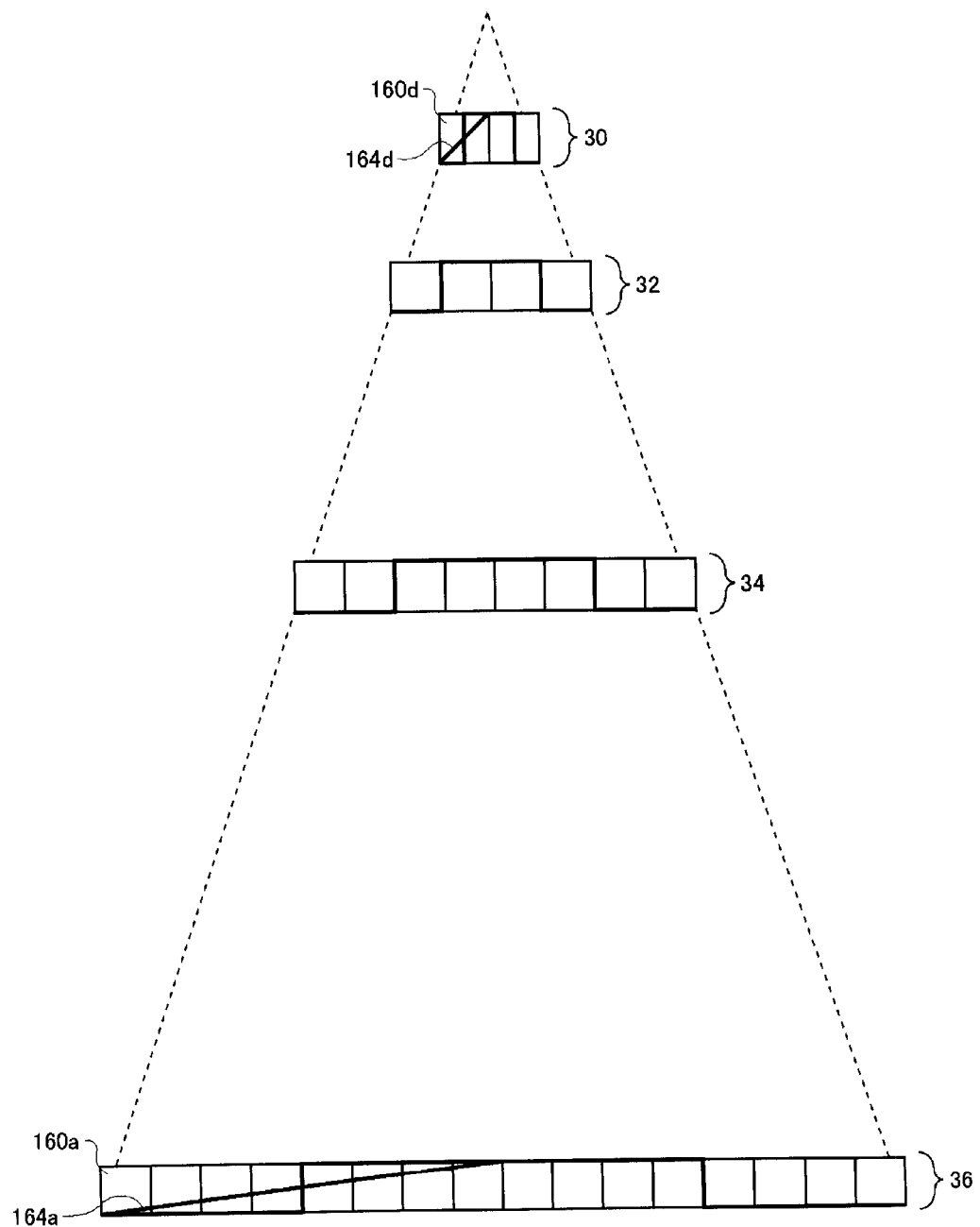
FIG. 11 is a diagram that shows a derived correction function.
Figure 12:
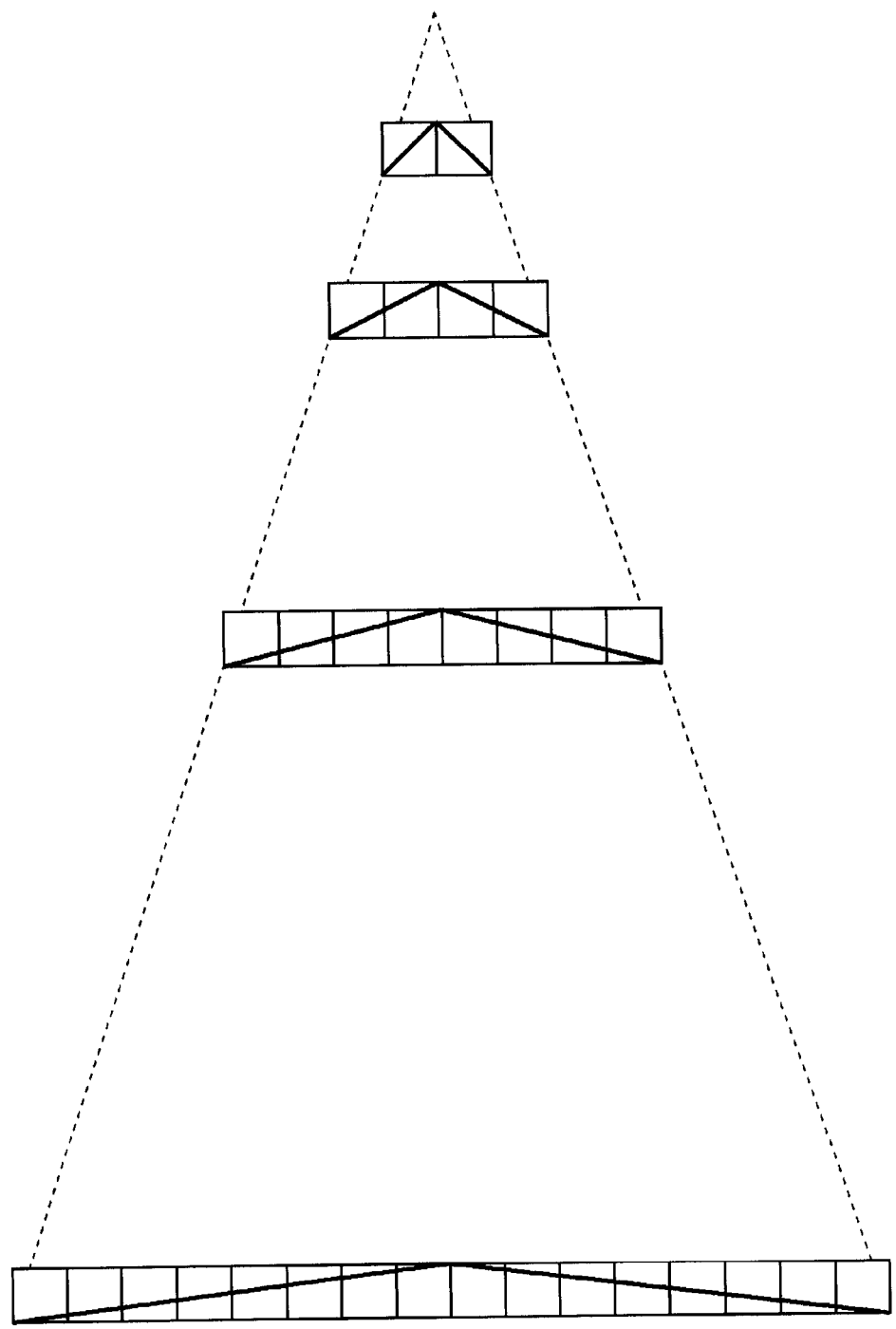
FIG. 12 is a diagram that shows correction functions derived in all the layers.

FIG. 11 shows an example in which a correction function 164*a* of the block image 160*a* in the third layer 36 is derived from the correction function 164*d* of the block image 160*d* in the zeroth layer 30. The block image 160*d* in the zeroth layer 30 is formed by reducing eight block images, which are the block image 160*a* and the adjacent block images on the right side, in the third layer 36; accordingly, when the correction function 164*d* is derived, the correction function 164*a* for the corresponding eight block images in the third layer 36 can be derived, as shown in FIG. 11. By performing the above processing on block images in the respective layers, correction functions can be derived in all the layers, as shown in FIG. 12.

More specifically, first, the decoding unit 132 decodes a compressed tile image into an M-bit gradation tile image. In the embodiment, the decoding unit 132 decodes a tile image into an 8-bit gradation tile image. The pixel values of 8-bit gradation tile images are shown as the lines 162*a*, 162*b*, 162*c*, and 162*d* in FIG. 9. As mentioned previously, each tile image is formed by coding multiple block images.

The determination unit 154 in the correction function generating unit 150 determines if a block image used to generate display image data includes correction information. If correction information is included, the determination unit 154 provides the correction information to the function deriving unit 152, which then derives a correction function using the correction information. In the example of FIG. 9, if the block image 160*d* in the zeroth layer 30 is the image data used to generate display image data, since the block image 160*d* includes correction information, the function deriving unit 152 will derive the correction function 164*d* as shown in FIG. 10. After the correction function 164*d* is derived, the display image generating unit 140 generates display image data using the decoded tile image and the correction function 164*d*.

If the block image 160*a* in the third layer 36 is the image data used to generate display image data, the determination unit 154 will determine that the block image 160*a* does not include correction information. Accordingly, the determination unit 154 refers to the corresponding block image 160*b* with a lower resolution and determines if the block image 160*b* includes correction information. Since the block image 160*b* does not include correction information either, the determination unit 154 continues to determine if a block image with a still lower resolution includes correction information until the determination unit 154 finds a block image 160 including correction information or refers to a block image with the lowest resolution. In the example of FIG. 9, since the block image 160*d* in the zeroth layer 30 includes correction information, the determination unit 154 provides the correction information to the function deriving unit 152, and the function deriving unit 152 then derives the correction function 164*a* of the block image 160*a* from the correction information in the block image 160*d*. Accordingly, the display image generating unit 140 generates display image data using the decoded tile image and the correction function 164*a* (see FIG. 11). The display image generating unit 140 may use a correction function to generate display image data for Deep-Color output or to generate display image data resulting from dithering.

In the above description, when the determination unit 154 refers to a block image and the block image does not include correction information, the determination unit 154 refers to a block image in the adjacent layer. However, the determination unit 154 may refer to another corresponding block image with a lower resolution skipping over the adjacent layer. For example, in order to reduce the time for reference, if correction information is not included in a block image used to generate display image data, the determination unit 154 may refer to a corresponding block image with the lowest resolution.

Figure 13:
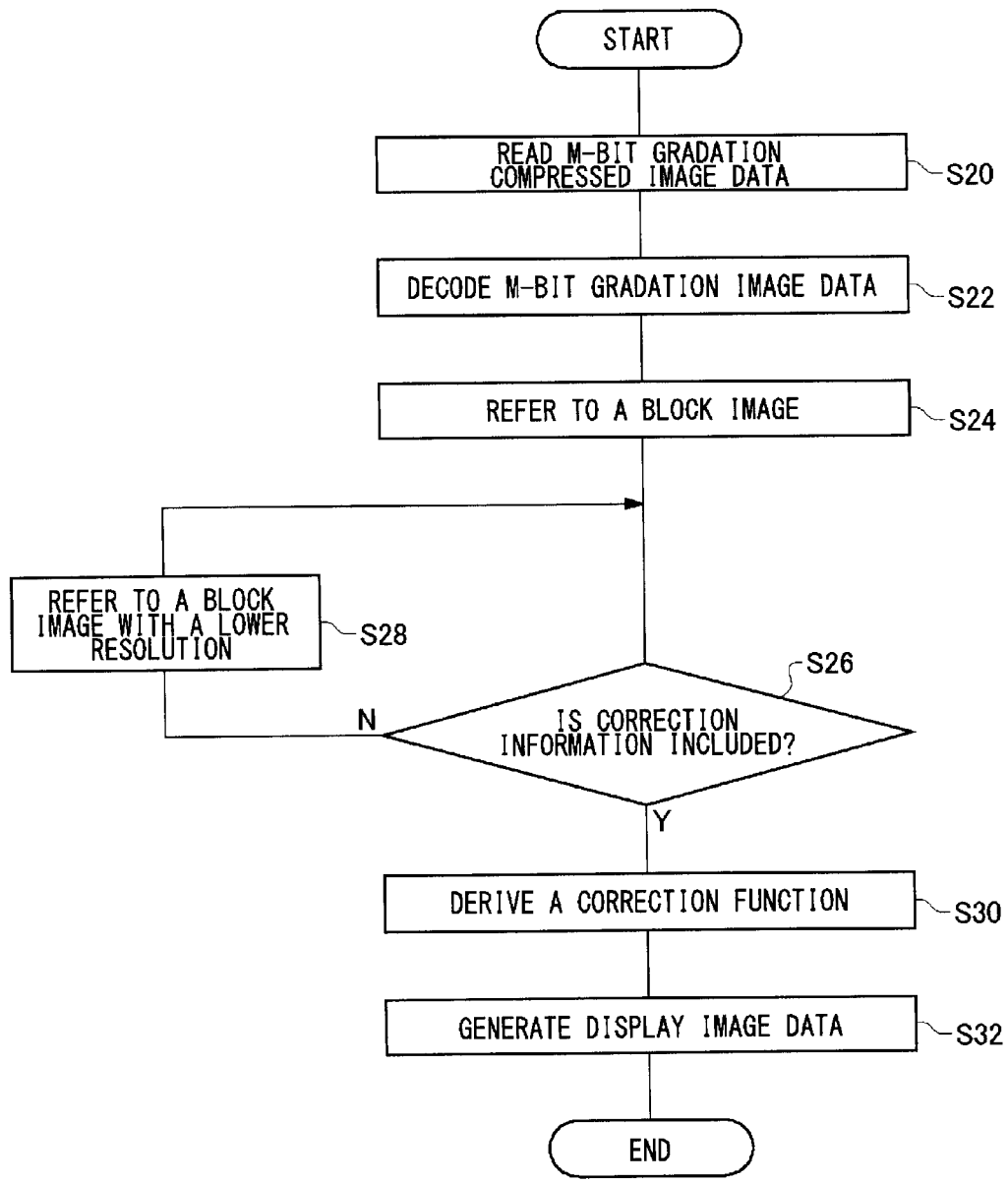
FIG. 13 is a flowchart of processing for deriving a correction function using a hierarchical structure.

FIG. 13 is a flowchart of processing for deriving a correction function using a hierarchical structure. The main memory 60 stores compressed image data in M-bit gradation (M is a natural number). The image data acquisition unit 130 reads from the main memory 60 an M-bit gradation tile image required to generate display image data (S20) and provides the tile image to the decoding unit 132. The decoding unit 132 decodes the compressed tile image into an M-bit gradation tile image (S22). The determination unit 154 refers to a block image used to generate display image data (S24) and determines if the block image includes correction information (S26). If correction information is not included therein (N at S26), the determination unit 154 refers to a corresponding block image with a lower resolution (S28) and determines if the block image includes correction information (S26). If correction information is included therein (Y at S26), the function deriving unit 152 uses the correction information to derive a correction function of the block image used to generate display image data (S30). Thereafter, the display image generating unit 140 generates display image data using the decoded tile image and the correction function (S32).

The present invention has been described with reference to the embodiments. The embodiments are intended to be illustrative only, and it will be obvious to those skilled in the art that various modifications to constituting elements or processes could be developed and that such modifications also fall within the scope of the present invention.

What is claimed is:

1. An image processing apparatus, comprising:
   an image data storage unit configured to store: (i) M-bit gradation image data (M is a natural number), and (ii) at least one compressed tile image per different resolution, each tile image being formed by coding a plurality of block images;
   a correction function generating unit configured to generate a correction function in N-bit gradation (N is a natural number, N>M) from the M-bit gradation image data stored in the image data storage unit, where the correction function generating unit includes:
      a determination unit configured to determine if a block image used to generate display image data includes correction information indicating that a pixel value in a block image is varying; and
      a function deriving unit configured to derive the correction function using correction information, wherein:

the determination unit determines, when a block image used to generate display image data does not include correction information, if a corresponding block image with a lower resolution includes correction information; and the function deriving unit derives, when a block image with a lower resolution includes correction information, the correction function using the correction information; and a display image generating unit configured to generate display image data using the correction function generated by the correction function generating unit, wherein the display image generating unit uses the correction function in N-bit gradation from the correction function generating unit to generate display image data in P-bit gradation (P is a natural number, N≧P>M) by performing an interpolation operation on the M-bit gradation image data.

2. The image processing apparatus of claim 1, wherein:
the correction function generating unit decodes compressed image data in M-bit gradation into image data in N-bit gradation to generate a correction function; and the display image generating unit uses a correction function so as to generate display image data resulting from correcting image data obtained by decoding compressed image data in M-bit gradation with the restriction of M-bit quantization.

3. The image processing apparatus of claim 1, wherein:
the image data storage unit stores image data in 8-bit gradation in JPEG format;

the correction function generating unit performs an inverse discrete cosine transform on the image data to generate N-bit gradation image data (N>8); and the display image generating unit generates display image data using N-bit gradation image data.

4. An image processing apparatus, comprising:
an image data storage unit configured to store M-bit gradation image data (M is a natural number) including at least one compressed tile image per different resolution;

a decoding unit configured to decode a compressed tile image into an M-bit gradation tile image; and a display image generating unit configured to generate display image data from a decoded tile image, each tile image being formed by coding a plurality of block images, the image processing apparatus further comprising:

a determination unit configured to determine if a block image used to generate display image data includes correction information indicating that a pixel value in a block image is varying; and a function deriving unit configured to derive, when correction information is included, a correction function using the correction information, wherein the display image generating unit generates display image data using a decoded tile image and the correction function, the determination unit determines, when a block image used to generate display image data does not include correction information, if a corresponding block image with a lower resolution includes correction information, and the function deriving unit derives, when a block image with a lower resolution includes correction information, a correction function using the correction information.

5. A non-transitory, computer readable, storage medium containing a program executable by a processor, the program comprising:

a module configured to generate, from M-bit gradation image data (M is a natural number), a correction function in N-bit gradation (N is a natural number, N>M), wherein the module configured to generate the correction function: (i) determines if a block image used to generate display image data includes correction information indicating that a pixel value in a block image is varying, where at least one compressed tile image per different resolution is formed by coding a plurality of the block images, and where the determination includes determining, when a block image used to generate display image data does not include correction information, if a corresponding block image with a lower resolution includes correction information, and (ii) derives the correction function using correction information, where the derivation includes deriving, when a block image with a lower resolution includes correction information, the correction function using the correction information; and a module configured to generate display image data using the generated correction function in N-bit gradation image data to generate the display image data in P-bit gradation (P is a natural number, N≧P>M) by performing an interpolation operation on the M-bit gradation image data.

6. A non-transitory, computer readable, storage medium containing a program executable by a processor, the program comprising:

a module configured to decode a compressed tile image in M-bit gradation (M is a natural number) formed by coding a plurality of block images, into a tile image in M-bit gradation;

a module configured to determine if a block image used to generate display image data includes correction information indicating that a pixel value in a block image is varying;

a module configured to derive, when correction information is included, a correction function using the correction information; and a module configured to generate display image data using a decoded tile image and the correction function, wherein:

the module configured to determine determines, when a block image used to generate display image data does not include correction information, if a corresponding block image with a lower resolution includes correction information, and the module configured to derive derives, when a block image with a lower resolution includes correction information, a correction function using the correction information.

7. An image processing method, comprising:
generating, from M-bit gradation image data (M is a natural number) stored in an image data storage unit, a correction function in N-bit gradation (N is a natural number, N>M) wherein the generating step includes: (i) determining if a block image used to generate display image data includes correction information indicating that a pixel value in a block image is varying, where at least one compressed tile image per different resolution is formed by coding a plurality of the block images, and where the determination includes determining, when a block image used to generate display image data does not include correction information, if a corresponding block image with a lower resolution includes correction information, and (ii) deriving the correction function using correction information, where the derivation includes deriving, when a block image with a lower resolution includes correction information, the correction function using the correction information; and generating display image data using the generated correction function in N-bit gradation to generate the display image data in P-bit gradation (P is a natural number, $N \geq P > M$) by performing an interpolation operation on the M-bit gradation image data.

8. An image processing method, comprising:

decoding a compressed tile image in M-bit gradation (M is a natural number) formed by coding a plurality of block images, into a tile image in M-bit gradation;

determining if a block image used to generate display image data includes correction information indicating that a pixel value in a block image is varying;

deriving, when correction information is included, a correction function using the correction information; and generating display image data using a decoded tile image and the correction function, wherein:

the step of determining includes determining, when a block image used to generate display image data does not include correction information, if a corresponding block image with a lower resolution includes correction information, and the step of deriving includes deriving, when a block image with a lower resolution includes correction information, a correction function using the correction information.

* * * * *